US012750205B2

(12) United States Patent
Cheon et al.

(10) Patent No.: US 12,750,205 B2
(45) **Date of Patent: *Sep. 29, 2026**

(54) PRACTICAL SORTING ON LARGE-SCALE ENCRYPTED DATA

(71) Applicants: Crypto Lab Inc., Seoul (KR); Seoul National University R&DB Foundation, Seoul (KR)

(72) Inventors: Jung Hee Cheon, Seoul (KR); Seungwan Hong, Seoul (KR)

(73) Assignees: Crypto Lab Inc., Seoul (KR); Seoul National University R&DB Foundation, Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 18/915,995

(22) Filed: Oct. 15, 2024

(65) Prior Publication Data

US 2025/0038949 A1 Jan. 30, 2025

Related U.S. Application Data

(63) Continuation of application No. 17/616,349, filed as application No. PCT/KR2020/007350 on Jun. 5, 2020, now Pat. No. 12,149,604.

(60) Provisional application No. 62/857,617, filed on Jun. 5, 2019.

(30) Foreign Application Priority Data

Mar. 25, 2020 (KR) ........................ 10-2020-0036119

(51) Int. Cl.
*H04L 9/00* (2022.01)
*H04L 9/06* (2006.01)

(52) U.S. Cl.
CPC ................ *H04L 9/008* (2013.01); *H04L 9/06* (2013.01); *H04L 2209/125* (2013.01)

(58) Field of Classification Search
CPC ...... H04L 9/008; H04L 9/06; H04L 2209/125
See application file for complete search history.

(56) References Cited

U.S. PATENT DOCUMENTS

| | | | | |
|---|---|---|---|---|
| 10,007,865 | B1 * | 6/2018 | Kim | G06N 3/084 |
| 10,601,584 | B2 * | 3/2020 | Takatsukasa | G06F 21/602 |
| 10,701,034 | B2 * | 6/2020 | Mower | H04L 12/6418 |
| 11,550,961 | B1 * | 1/2023 | Horesh | G06N 20/00 |
| 12,095,896 | B1 * | 9/2024 | Retivykh | H04L 9/0869 |
| 12,135,811 | B2 * | 11/2024 | Fox-Epstein | G06F 21/6218 |
| 12,149,604 | B2 * | 11/2024 | Cheon | H04L 9/06 |
| 12,219,043 | B1 * | 2/2025 | Rososhek | H04L 9/008 |

* cited by examiner

*Primary Examiner* — Hosuk Song
(74) *Attorney, Agent, or Firm* — Osha Bergman Watanabe & Burton LLP

(57) ABSTRACT

A method for processing homomorphic ciphertexts includes: receiving an input of an instruction for sorting regarding a plurality of homomorphic ciphertexts; sorting the plurality of homomorphic ciphertexts by using a sorter which can sort 3 more homomorphic ciphertexts in a single stage; and outputting the sorting result. The sorter performs sorting by using a comparison function that selectively outputs a bigger value or a smaller value between two input values.

15 Claims, 10 Drawing Sheets

FIG. 7

Algorithm 3-Sort Algorithm

```
function SORT3 (a,b,c,[a > b],[b > c],[a > c])
    max, min ← LT[α>b](a,b)
    [max > c] ← LT[a>b]([a > c],[b > c])
    w1 ← L[max>c](max,c)
    w3 ← L[min>c](c,min)
    w2 ← a + b + c - w1- w3
    return w1,w2,w3
end funtion
```

FIG. 8

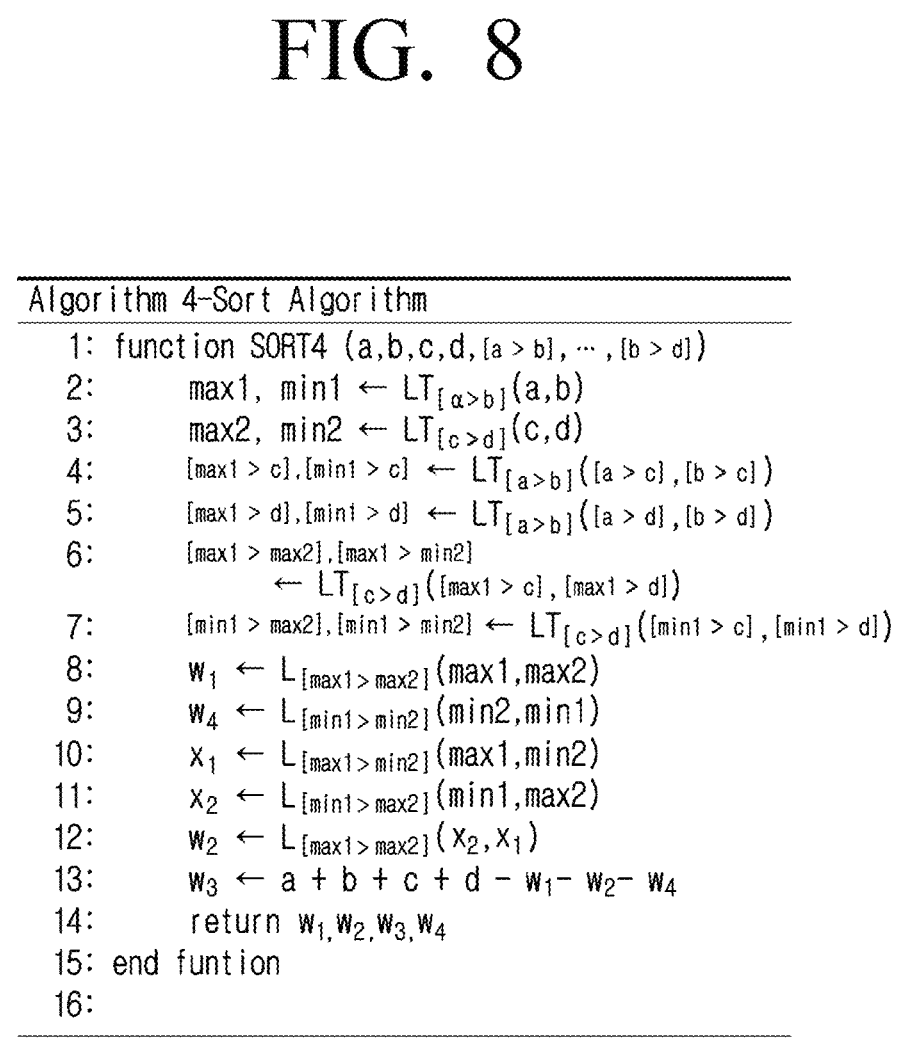

Algorithm 4-Sort Algorithm

```
function SORT4 (a,b,c,d,[a > b], ··· ,[b > d])
    max1, min1 ← LT_[α>b](a,b)
    max2, min2 ← LT_[c>d](c,d)
    [max1 > c],[min1 > c] ← LT_[a>b]([a > c],[b > c])
    [max1 > d],[min1 > d] ← LT_[a>b]([a > d],[b > d])
    [max1 > max2],[max1 > min2]
          ← LT_[c>d]([max1 > c],[max1 > d])
    [min1 > max2],[min1 > min2] ← LT_[c>d]([min1 > c],[min1 > d])
    w_1 ← L_[max1>max2](max1,max2)
    w_4 ← L_[min1>min2](min2,min1)
    x_1 ← L_[max1>min2](max1,min2)
    x_2 ← L_[min1>max2](min1,max2)
    w_2 ← L_[max1>max2](x_2,x_1)
    w_3 ← a + b + c + d - w_1- w_2- w_4
    return w_1,w_2,w_3,w_4
end funtion
```

FIG. 9

```
Algorithm 5-Sort Algorithm
function SORT5 (a,⋯,e,[a > b],⋯,[b > e])
      max1, mid1, min1
              ← SORT3(a,b,c[a > b],[b > c],[a > c])
      (max2, min2) ← LT[d > e](d,e)
      [max1 > d],[mid1 > d],[min1 > d]
              ← SORT3([a > d],[b > d],[c > d],[a > b],[b > c],[c > a])
                 ▷ [c > a] = 1 − [a > c]
      [max1 > e],[mid1 > e],[min1 > e]
              ← SORT3([a > e],[b > e],[c > e],[a > b],[b > c],[c > a])
      [max1 > max2],[max1 > min2]
              ← LT[d > e]([max1 > d],[max1 > e]
      [mid1 > max2],[mid1 > min2] ← LT[d > e]([mid1 > d],[mid1 > e]
      [min1 > max2],[mid1 > min2] ← LT[d > e]([min1 > d],[min1 > e]
      w_1 ← L[max1 > max2](max1,max2)
      w_5 ← L[min1 > min2](min2,min1)
      x_1 ← L[max1 > min2](max1,min2)
      x_2 ← L[mid1 > max2](mid1,max2)
      w_2 ← L[max1 > max2](x_2,x_1)
      y_1 ← L[min1 > max2](max2,min1)
      y_2 ← L[mid1 > min2](min2,mid2)
      w_4 ← L[min1 > min2](y_1,x_2)
      w_3 ← a + b + c + d + e − w_1 − w_2 − w_4 − w_5
      return w_1,w_2,w_3,w_4,w_5
end funtion
```

PRACTICAL SORTING ON LARGE-SCALE ENCRYPTED DATA

TECHNICAL FIELD

The disclosure relates to a device for sorting approximately encrypted ciphertexts and a method therefor, and more particularly, to a device for effectively performing sorting for approximately encrypted ciphertexts, and a method therefor.

DESCRIPTION OF THE RELATED ART

As communication technologies have developed, and distribution of electronic devices have become active, effort for maintaining communication security between electronic devices is being continuously made. Accordingly, in most communication environments, ciphertext/decryption technologies are being used.

When a message encrypted by a ciphertext technology is transferred to a counterpart, the counterpart should perform decryption for using the message. In this case, in the process wherein the counterpart decrypts the encrypted data, waste of resources and time occurs. Also, in case hacking by a third party is performed while the counterpart temporarily decrypted the message for a calculation, there is a problem that the message can be easily leaked to the third party.

For resolving such a problem, a method for homomorphic ciphertext is being studied. If a homomorphic ciphertext method is used, even if a calculation is performed in a ciphertext itself without decrypting encrypted information, the same result as a value of performing a calculation for a plain text and then encrypting the text can be obtained. Accordingly, various kinds of calculations can be performed while a ciphertext is not decrypted.

As sorting is needed for calculations such as k-means clustering, top-k data calculations, binning, statistical analysis, etc., a sorting process is required for homomorphic ciphertexts recently.

However, calculations of a homomorphic ciphertext support only limited basic calculations such as addition, multiplication, etc., and quick sort, merge sort, etc. that were conventionally used widely consist of repeating a process of determining a next subject to be compared with the comparison result in the previous step, and thus a sorting algorithm appropriate for homomorphic ciphertexts is required.

DETAILED DESCRIPTION OF THE INVENTION

Technical Problem

Accordingly, the disclosure was devised for resolving the aforementioned problem, and the purpose of the disclosure is in providing a device and a method for effectively performing sorting for approximately encrypted ciphertexts.

Technical Solution

The disclosure is for achieving the aforementioned purpose, and a method for processing homomorphic ciphertexts according to an embodiment of the disclosure includes the steps of receiving an input of an instruction for sorting regarding a plurality of homomorphic ciphertexts; sorting the plurality of homomorphic ciphertexts by using a sorter which can sort 3 more homomorphic ciphertexts in a single stage; and outputting the sorting result. The sorter performs sorting by using a comparison function that selectively outputs a bigger value or a smaller value between two input values.

Meanwhile, a calculation device according to an embodiment of the disclosure includes a memory storing a plurality of homomorphic ciphertexts for an approximate message including an error; and a processor sorting the plurality of homomorphic ciphertexts. The processor is configured to: sort the plurality of homomorphic ciphertexts by using a sorter which can sort 3 more homomorphic ciphertexts in a single stage, and the sorter performs sorting by using a comparison function that selectively outputs a bigger value or a smaller value between two input values.

Meanwhile, in a computer-readable recording medium including a program for executing a method for processing homomorphic ciphertexts according to an embodiment of the disclosure, the method for processing homomorphic ciphertexts includes the steps of receiving an input of an instruction for sorting regarding a plurality of homomorphic ciphertexts; and sorting the plurality of homomorphic ciphertexts by using a sorter which can sort 3 more homomorphic ciphertexts in a single stage. The sorter performs sorting by using a comparison function that selectively outputs a bigger value or a smaller value between two input values.

The disclosure is for achieving the aforementioned purpose, and a method for processing homomorphic ciphertexts according to an embodiment of the disclosure includes the steps of receiving an input of an instruction for sorting regarding a plurality of homomorphic ciphertexts, sorting the plurality of homomorphic ciphertexts by using a 5-way sorter which can sort five homomorphic ciphertexts in a single stage, and outputting the sorting result.

In this case, in the sorting step, a parallel sorting process may be performed by using a plurality of 5-way sorters.

Meanwhile, the 5-way sorter may perform sorting by using a comparison function that selectively outputs a bigger value or a smaller value between two input values.

In this case, the comparison function may be calculated through a multiplication calculation between an approximate sign function outputting a predetermined value according to comparison of sizes and an input value.

In this case, the approximate sign function may be a function which is a result of repetitively calculating a composite function of which output value is made to be close to 1 regarding an input value bigger than 0, and of which output value is made to be close to −1 regarding an input value smaller than 0 by a predetermined number of times.

In this case, the approximate sign function may be a function which is a result of repetitively calculating two different composite functions by three times, respectively.

Meanwhile, the 5-way sorter may, based on a first homomorphic ciphertext, a second homomorphic ciphertext, and a third homomorphic ciphertext being input, calculate a bigger value and a smaller value between the first homomorphic ciphertext and the second homomorphic ciphertext by using the comparison function, input the calculated bigger value and the third homomorphic ciphertext into the comparison function and output a first output value, input the calculated smaller value and the third homomorphic ciphertext into the comparison function and output a third output value, and calculate a second output value by subtracting the first output value and the third output value from a summed-up value for the first to third homomorphic ciphertexts and output the second output value.

Meanwhile, the 5-way sorter may extend plain sentence spaces of the five respective sorted homomorphic ciphertexts.

Meanwhile, a calculation device according to an embodiment of the disclosure includes a memory storing a plurality of homomorphic ciphertexts for an approximate message including an error, and a processor sorting the plurality of homomorphic ciphertexts, wherein the processor may sort the plurality of homomorphic ciphertexts by using a 5-way sorter which can sort five homomorphic ciphertexts in a single stage.

In this case, the processor may perform a parallel sorting process by using a plurality of 5-way sorters.

Meanwhile, the 5-way sorter may perform sorting by using a comparison function that selectively outputs a bigger value or a smaller value between two input values.

In this case, the comparison function may be calculated through a multiplication calculation between an approximate sign function outputting a predetermined value according to comparison of sizes and an input value.

In this case, the approximate sign function may be a function which is a result of repetitively calculating a composite function of which output value is made to be close to 1 regarding an input value bigger than 0, and of which output value is made to be close to −1 regarding an input value smaller than 0 by a predetermined number of times.

In this case, the approximate sign function may be a function which is a result of repetitively calculating two different composite functions by three times, respectively.

Meanwhile, the 5-way sorter may, based on a first homomorphic ciphertext, a second homomorphic ciphertext, and a third homomorphic ciphertext being input, calculate a bigger value and a smaller value between the first homomorphic ciphertext and the second homomorphic ciphertext by using the comparison function, input the calculated bigger value and the third homomorphic ciphertext into the comparison function and output a first output value, input the calculated smaller value and the third homomorphic ciphertext into the comparison function and output a third output value, and calculate a second output value by subtracting the first output value and the third output value from a summed-up value for the first to third homomorphic ciphertexts and output the second output value.

Meanwhile, the 5-way sorter may extend plain sentence spaces of the five respective sorted homomorphic ciphertexts.

Meanwhile, in a computer-readable recording medium including a program for executing a method for processing homomorphic ciphertexts according to an embodiment of the disclosure, the method for processing homomorphic ciphertexts includes the steps of receiving an input of an instruction for sorting regarding a plurality of homomorphic ciphertexts, and sorting the plurality of homomorphic ciphertexts by using a 5-way sorter which can sort five homomorphic ciphertexts in a single stage.

Effect of the Invention

According to the various embodiments of the disclosure as above, sorting can be performed for a large amount of homomorphic ciphertexts, and a 5-way sorter that compares five homomorphic ciphertexts in a single stage is used, and thus sorting can be performed in a low number of stages, and accordingly, fast sorting is possible.

BRIEF DESCRIPTION OF THE DRAWINGS

FIG. 7 is a diagram for illustrating a sorting operation for three homomorphic ciphertexts;

FIG. 8 is a diagram for illustrating a sorting operation for four homomorphic ciphertexts;

FIG. 9 is a diagram for illustrating a sorting operation for five homomorphic ciphertexts.

BEST MODE FOR IMPLEMENTING THE INVENTION

[Mode for Implementing the Invention]

Figure 1:
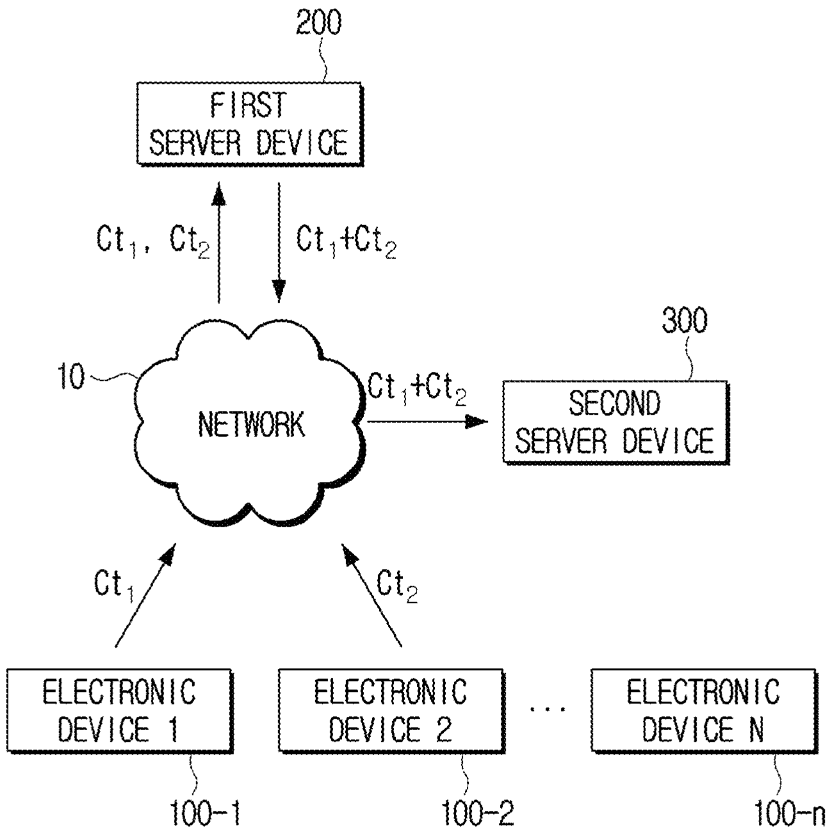
FIG. 1 is a diagram for illustrating a configuration of a network system according to an embodiment of the disclosure.

Hereinafter, the disclosure will be described in detail with reference to the accompanying drawings. Meanwhile, to an information (data) transmission process performed in the disclosure, ciphertext/decryption may be applied depending on needs, and all expressions describing an information (data) transmission process in the disclosure and the claims should be interpreted to include cases of performing ciphertext/decryption, even if there are no separate mentions in this regard. Also, in the disclosure, expressions in forms such as "transmit (transfer) from A to B" or "A receives from B" also include a case wherein an object is transmitted (transferred) or received while another medium is included in between, and the expressions do not necessarily express only a case wherein an object is directly transmitted (transferred) or received from A to B.

In addition, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. Also, the term "include" in the disclosure includes a case wherein elements other than elements listed as being included are further included.

Also, in the disclosure, only essential components necessary for description of the disclosure are explained, and components that are not related to the essence of the disclosure are not mentioned. In addition, the description of the disclosure should not be interpreted as exclusive meaning including only the components mentioned, but should be interpreted as non-exclusive meaning that other components may be included.

Further, in the disclosure, "a value" is defined as a concept including not only a scalar value, but also a vector.

Also, mathematical calculations and computations in each step of the disclosure described below may be implemented as computer calculations by a coding method publicly known for performing the calculations or the computations and/or coding appropriately designed for the disclosure.

In addition, specific mathematical formulae described below are described as examples among several possible alternatives, and the scope of protection of the disclosure should not be interpreted to be limited to the mathematical formulae mentioned in the disclosure.

For the convenience of explanation, notations as follows are designated in the disclosure.

$a \leftarrow D$: select an element a according to a distribution D s1, s2∈R: Each of S1 and S2 is an element belonging to an R set.

mod(q): a modular calculation with an element q $\lceil \cdot \rfloor$: an inside value is rounded off Hereinafter, various embodiments of the disclosure will be described in detail with reference to the accompanying drawings.

FIG. 1 is a diagram for illustrating a configuration of a network system according to an embodiment of the disclosure.

Referring to FIG. 1, a network system may include a plurality of electronic devices 100-1-100-*n*, a first server device 200, and a second server device 300, and each component may be connected with one another through a network 10.

The network 10 may be implemented as wired or wireless communication networks, a broadcasting communication network, an optical communication network, a cloud network in various forms, etc., and each device may be connected with one another by a method such as Wi-Fi, Bluetooth, Near Field Communication (NFC), etc. without a separate medium.

In FIG. 1, it is illustrated that there are a plurality of electronic devices 100-1-100-*n*, but a plurality of electronic devices do not necessarily have to be used, and one device may be used. As an example, the electronic devices 100-1-100-*n* may be implemented as devices in various forms such as a smartphone, a tablet, a game player, a PC, a laptop PC, a home server, a kiosk, etc., and other than them, the electronic devices may be implemented in forms of home appliances to which an IoT function is applied.

A user may input various information through the electronic devices 100-1-100-*n* that the user uses. Input information may be stored in the electronic devices 100-1-100-*n* themselves, but the information may be transferred to an external device and stored for reasons of storage capacity and security, etc. In FIG. 1, the first server device 200 may perform a role of storing such information, and the second server device 300 may perform a role of using some or all of the information stored in the first server device 200.

Each electronic device 100-1-100-*n* may homomorphically encrypt the input information, and transfer a homomorphic ciphertext to the first server device 200.

Each electronic device 100-1-100-*n* may include a ciphertext noise calculated in a process of performing homomorphic ciphertext, i.e., an error in a ciphertext. Specifically, a homomorphic ciphertext generated in each electronic device 100-1-100-*n* may be generated in a form wherein a result value including a message and an error value is restored when it is decrypted by using a secret key later.

As an example, a homomorphic ciphertext generated in the electronic devices 100-1-100-*n* may be generated in a form satisfying a property as follows when it is decrypted by using a secret key.

$$Dec(ct,sk)=\langle ct,sk\rangle=M+e(\text{mod } q) \qquad \text{[Formula 1]}$$

Here, <, > means a usual inner product, ct means a ciphertext, sk means a secret key, M means a plain sentence message, e means a ciphertext error value, and mod q means a modulus of the ciphertext. Meanwhile, q should be selected to be bigger than M which is a result value wherein a scaling factor Δ is multiplied with a message. If an absolute value of the error value e is sufficiently small compared to M, a decryption value M+e of the ciphertext is a value that can replace an original message with the same precision in a significant number calculation. In decrypted data, an error may be arranged on the side of the lowest bit (LSB), and M may be arranged on the side of the second lowest bit.

In case the size of a message is too small or too big, the size may be adjusted by using a scaling factor. If a scaling factor is used, not only a message in an integer form but also a message in a real number form can be encrypted, and thus usability can be greatly increased. Also, by adjusting the size of a message by using a scaling factor, the size of an area wherein messages exist, i.e., a valid area can be adjusted in a ciphertext after a calculation was performed.

Depending on embodiments, a ciphertext modulus q may be used while being set in various forms. As an example, a modulus of a ciphertext may be set in a form of $q=\Delta^L$ which is an exponentiation of the scaling factor Δ. If Δ is 2, the modulus may be set as a value like $q=2^{10}$.

The first server device 200 may not decrypt a received homomorphic ciphertext, but store it in a state of a ciphertext.

The second server device 300 may request a result of specific processing for a homomorphic ciphertext to the first server device 200. The first server device 200 may perform a specific calculation according to the request of the second server device 300, and then transfer the result to the second server device 300.

As an example, in case ciphertexts ct1 and ct2 transferred from two electronic devices 100-1, 100-2 are stored in the first server device 200, the second server device 300 may request a value of summing up the information provided from the two electronic devices 100-1, 100-2 to the first server device 200. The first server device 200 may perform a calculation of summing up the two ciphertexts according to the request, and transfer the result value (ct1+ct2) to the second server device 300.

By virtue of the property of a homomorphic ciphertext, the first server device 200 may perform a calculation in a state of not performing decryption, and a result value thereof also becomes a form of a ciphertext. In the disclosure, a result value obtained by a calculation is referred to as a calculation result ciphertext.

The first server device 200 may transfer the calculation result ciphertext to the second server device 300. The second server device 300 may decrypt the received calculation result ciphertext, and obtain a calculation result value of data included in each homomorphic ciphertext.

Such a calculation for homomorphic ciphertexts may not only be a calculation formula consisting of an addition, a subtraction, and a multiplication, but also a comparison operation such as a calculation of a maximum value, a calculation of a minimum value, and a comparison of sizes. Also, such a calculation may be a sorting for a plurality of homomorphic ciphertexts using a comparison operation. As the first server device 200 can perform a calculating operation described above, it may also be referred to as a calculation device. A specific method for sorting will be described later with reference to FIG. 3.

Then, if a ratio of an approximate message exceeds a threshold value, the first server device 200 may perform a rebooting (bootstrapping) calculation. A bootstrapping operation will be described later with reference to FIG. 3.

Meanwhile, in FIG. 1, a case wherein ciphertext is performed in the first electronic device and the second electronic device, and the second server device performs decryption is illustrated, but the disclosure is not limited thereto.

Figure 2:
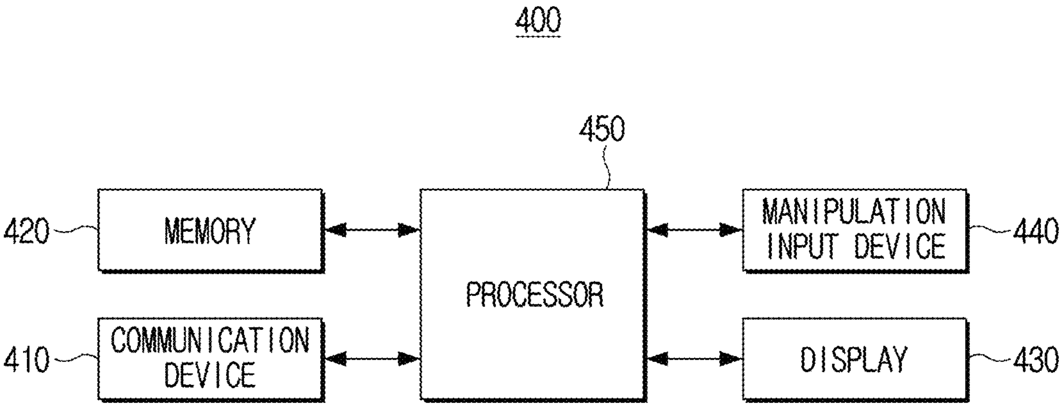
FIG. 2 is a block diagram illustrating a configuration of a calculation device according to an embodiment of the disclosure.

FIG. 2 is a block diagram illustrating a configuration of a calculation device according to an embodiment of the disclosure.

Specifically, in the system in FIG. 1, devices performing homomorphic ciphertext such as the first electronic device and the second electronic device, a device calculating a homomorphic ciphertext such as the first server device, and a device decrypting a homomorphic ciphertext such as the second server device, etc. may be referred to as calculation devices. Such calculation devices may be various devices like a personal computer (PC), a laptop computer, a smartphone, a tablet, a server, etc.

Referring to FIG. 2, a calculation device 400 may include a communication device 410, a memory 420, a display 430, a manipulation input device 440, and a processor 450.

The communication device 410 is formed to connect the calculation device 400 with an external device (not shown), and it may not only be in a form of being connected to an external device through a near field communication network (a local area network: a LAN) and an Internet network, but also be in a form of being connected through a universal serial bus (USB) port or a wireless communication (e.g., WiFi 802.11a/b/g/n, NFC, Bluetooth) port. Such a communication device 410 may also be referred to as a transceiver.

The communication device 410 may receive a public key from an external device, and transfer a public key generated by the calculation device 400 itself to the external device.

Also, the communication device 410 may receive a message from an external device, and send a generated homomorphic ciphertext to the external device. In addition, the communication device 410 may receive a homomorphic ciphertext from the external device.

Further, the communication device 410 may receive various kinds of parameters necessary for generating a ciphertext from an external device. Meanwhile, in actual implementation, various kinds of parameters may be directly input from a user through the manipulation input device 440 that will be described below.

Also, the communication device 410 may be requested a calculation for a homomorphic ciphertext from an external device, and transfer a calculated result in accordance thereto to the external device. Here, the requested calculation may be a calculation such as an addition, a subtraction, and a multiplication, and it may also be a comparison operation which is a nonpolynomial calculation, or a sorting processing.

In the memory 420, at least one instruction regarding the calculation device 400 may be stored. Specifically, in the memory 420, various kinds of programs (or software) for the calculation device 400 to operate according to the various embodiments of the disclosure may be stored.

Such a memory 420 may be implemented in various forms such as a RAM or a ROM, a flash memory, an HDD, an external memory, a memory card, etc., and it is not limited to any one.

The memory 420 may store a message to be encrypted. Here, a message may be various kinds of credit information, personal information, etc. that a user authenticated, and it may also be information related to a use history such as location information, information on the Internet use time, etc. used in the calculation device 400.

Also, the memory 420 may store a public key, and in case the calculation device 400 is the device that directly generated the public key, the memory 420 may store not only a secret key, but also various kinds of parameters necessary for generating a public key and a secret key.

In addition, the memory 420 may store a homomorphic ciphertext generated in a process that will be described below. Also, the memory 420 may store a homomorphic ciphertext transferred from an external device. Further, the memory 420 may store a calculation result ciphertext which is a result in a calculation process that will be described below.

The display 430 displays a user interface window for receiving selection of functions supported by the calculation device 400. Specifically, the display 430 may display a user interface window for receiving selection of various kinds of functions provided by the calculation device 400. Such a display 430 may be a monitor such as a liquid crystal display (LCD), organic light emitting diodes (OLED), etc., and it may also be implemented as a touch screen that can simultaneously perform the function of the manipulation input device 440 that will be described below.

The display 430 may display a message requesting input of a parameter necessary for generating a secret key and a public key. Also, the display 430 may display a message for selecting a message through which a subject to be encrypted. Meanwhile, in actual implementation, a subject to be encrypted may be directly selected by a user, or it may be automatically selected. That is, personal information for which ciphertext is needed, etc. may be automatically set even if a user does not directly select a message.

The manipulation input device 440 may receive selection of a function of the calculation device 400 and input of a control instruction for the function from a user. Specifically, the manipulation input device 440 may receive input of a parameter necessary for generating a secret key and a public key from a user. Also, the manipulation input device 440 may receive setting of a message to be encrypted from a user.

Further, the manipulation input device 440 may receive input of a sorting instruction, or receive selection of a homomorphic ciphertext which is a subject to be sorted.

The processor 450 controls the overall operations of the calculation device 400. Specifically, the processor 450 may control the overall operations of the calculation device 400 by executing at least one instruction stored in the memory 420. Such a processor 450 may consist of a single device such as a central processing unit (CPU), an application-specific integrated circuit (ASIC), etc., and it may also consist of a plurality of devices such as a CPU, a graphics processing unit (GPU), etc.

When a message to be transferred is input, the processor 450 may store it in the memory 420. Then, the processor 450 may homomorphically encrypt the message by using various kinds of setting values and programs stored in the memory 420. In this case, a public key may be used.

The processor 450 may generate a public key necessary for performing ciphertext by itself and use it, or receive a public key from an external device and use it. As an example, the second server device 300 performing decryption may distribute public keys to other devices.

In the case of generating a key by itself, the processor 450 may generate a public key by using a Ring-LWE technic. Describing in detail, the processor 450 may first set various kinds of parameters and rings, and store them in the memory 420. As examples of parameters, there may be the length of a plain sentence message bit, the sizes of a public key and a secret key, etc.

A ring may be expressed by a formula as follows.

$$R=\mathbb{Z}_q[x]/(f(x)) \quad \text{[Formula 2]}$$

Here, R is a ring, Zq is a coefficient, and f(x) is an N-th polynomial.

A ring refers to a set of polynomials having a predetermined coefficient, and it means a set wherein additions and multiplications are defined between elements, and which is closed against additions and multiplications. Such a ring may also be referred to as 'hwan.'

As an example, a ring means a set of N-th polynomials of which coefficient is Zq. Specifically, when n is Φ(N), a ring means an N-th cyclotomic polynomial. Meanwhile, (f(x)) indicates an ideal of Zq[x] generated with f(x). Also, an Euler totient function Φ(N) means the number of natural numbers which are relative primes with N, and which are smaller than N. If $\Phi_N(x)$ is defined as an N-th cyclotomic polynomial, a ring may also be expressed by a formula 3 as follows.

$$R=\mathbb{Z}_q[x]/(\Phi_N(x)) \quad \text{[Formula 3]}$$

A secret key sk may be expressed as follows.

Meanwhile, the ring in the aforementioned formula 3 has a complex number in a plain sentence space. Meanwhile, for improving a calculation speed for a homomorphic ciphertext, only sets wherein a plain sentence space is a real number may be used among the aforementioned sets of rings.

When such a ring is set, the processor 450 may calculate a secret key sk from the ring.

$$sk \leftarrow (1, s(x)), s(x) \in R \quad \text{[Formula 4]}$$

Here, s(x) means a polynomial randomly generated with a small coefficient.

Then, the processor 450 calculates a first random polynomial a(x) from the ring. The first random polynomial may be expressed as follows.

$$a(x) \leftarrow R \quad \text{[Formula 5]}$$

Also, the processor 450 may calculate an error. Specifically, the processor 450 may extract an error from a discrete Gaussian distribution or a distribution of which statistical distance is close to it. Such an error may be expressed as follows.

$$e(x) \leftarrow D^n_{\alpha q} \quad \text{[Equation 6]}$$

When an error is calculated, the processor 450 may perform a modular calculation of the error to the first random polynomial and the secret key and calculate a second random polynomial. The second random polynomial may be expressed as follows.

$$b(x)=-a(x)s(x)+e(x)(\text{mod}\, q) \quad \text{[Formula 7]}$$

Ultimately, the public key pk is a form of including the first random polynomial and the second random polynomial, and it is set as follows.

$$pk=(b(x), a(x)) \quad \text{[Formula 8]}$$

As the aforementioned method for generating keys is merely an example, the disclosure is not necessarily limited thereto, and a public key and a secret key can obviously be generated by methods other than this.

Meanwhile, when a public key is generated, the processor 450 may control the communication device 410 such that the generated public key is transferred to other devices.

Then, the processor 450 may generate a homomorphic ciphertext for a message. Here, the processor 450 may perform an encoding calculation of precedingly converting a message into a polynomial.

Then, the processor 450 may generate a ciphertext for the message converted into a polynomial form by using the public key pk=(b(x), a(x)) and a formula 9 as follows.

$$Ctxt=(v\cdot b(x)+\Delta\cdot M+e_0,\ v\cdot a(x)+e_i)\in R\times R \quad \text{[Formula 9]}$$

Here, the processor 450 may generate the length of the ciphertext to correspond to the size of the scaling factor.

A message to be encrypted may be received from an external source, or it may be input from an input device directly provided in or connected to the calculation device 400. Also, the scaling factor may be directly input by a user, or it may be provided through another device. For example, in case the calculation device 400 includes a touch screen or a keypad, the processor 450 may store data input by a user through a touch screen or a keypad in the memory 420, and then encrypt the data.

Meanwhile, according to an embodiment of the disclosure, packing may be performed. If packing is used in homomorphic ciphertext, it becomes possible to encrypt a plurality of messages into one ciphertext. In this case, if calculations among respective ciphertexts are performed in the calculation device 400, calculations for a plurality of messages are ultimately processed in parallel, and thus burden of calculations becomes greatly reduced.

Specifically, in case a message consists of a plurality of message vectors, the processor 450 may convert the message into a polynomial in a form that can encrypt the plurality of message vectors in parallel, and then multiply the scaling factor to the polynomial and perform homomorphic ciphertext by using the public key. Accordingly, the processor 450 may generate a ciphertext wherein the plurality of message vectors are packed.

Further, in case decryption for a homomorphic ciphertext is needed, the processor 450 may apply the secret key to the homomorphic ciphertext and generate a decryption in a polynomial form, and decode the decryption in a polynomial form and generate an approximate message. Here, the generated approximate message may include an error, as mentioned in the formula 1 described earlier.

In addition, the processor 450 may perform calculations for a ciphertext. Specifically, for a homomorphic ciphertext, the processor 450 may perform calculations such as an addition, a subtraction, a multiplication, etc. while an encrypted state is maintained.

Also, for a ciphertext, the processor 450 may perform calculations for a polynomial having calculations other than an addition, a subtraction, or a multiplication. Specifically, a homomorphic ciphertext is closed against an addition, a subtraction, and a multiplication, but is not closed against calculations other than them. Accordingly, for calculations other than an addition, a subtraction, and a multiplication, an approximate calculation formula expressed by the aforementioned three calculations should be used. Here, the approximate calculation formula may use a well-structured polynomial, i.e., a composite function to have low complexity.

Further, the processor 450 may perform sorting for a plurality of homomorphic ciphertexts. Specifically, the processor 450 may perform sorting for a plurality of homomorphic ciphertexts by using a 5-way sorter. Here, the processor 450 may perform the aforementioned sorting operations in parallel by using a plurality of 5-way sorters. Specific operations and configuration of a 5-way sorter will be described below with reference to FIG. 3.

In addition, when a calculation is completed, the processor 450 may detect data of a valid area from the calculation result data. Specifically, if a ratio of an approximate message in a calculation result ciphertext exceeds a threshold value, the processor 450 may perform a bootstrapping operation for the ciphertext.

Figure 3:
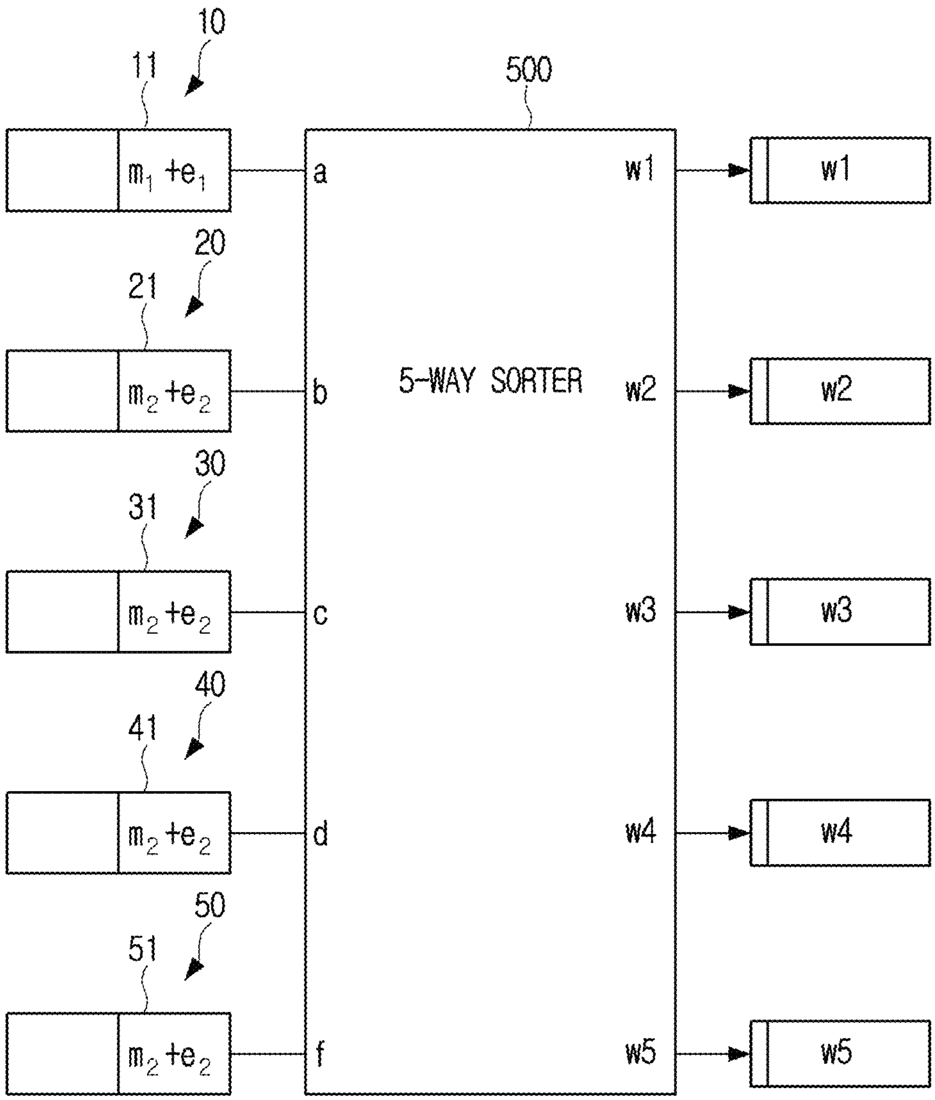
FIG. 3 is a diagram for illustrating a sorting operation of a calculation device according to the disclosure.

FIG. 3 is a diagram for illustrating a sorting operation of a calculation device according to the disclosure.

Referring to FIG. 3, a 5-way sorter 500 is disclosed. Such a 5-way sorter 500 may sort five homomorphic ciphertexts in a single stage.

Such a 5-way sorter 500 can sort two to four homomorphic ciphertexts by using a single stage. Hereinafter, for making explanation easy, a sorting operation for two homomorphic ciphertexts will be explained first, and a sorting method for three to five homomorphic ciphertexts will be described later with reference to FIG. 7 to FIG. 9.

First, a sorting method of two homomorphic ciphertexts will be explained.

In case a first homomorphic ciphertext and a second homomorphic ciphertext are input, the 5-way sorter 500 may output the homomorphic ciphertext having a bigger value between the two homomorphic ciphertexts as a first output value, and output the homomorphic ciphertext having a smaller value as a second output value.

For such a sorting, comparison of the two homomorphic ciphertexts is needed precedingly, and in the disclosure, an approximate sign function is used, and a comparison function is implemented by a multiplication calculation of such an approximate sign function and two input values. An approximate sign function may be expressed as a formula 10, and a comparison function may be expressed as a formula 11.

$$(a > b) = (b < a)\begin{cases} -1 \text{ if } a \gg b \\ = 0 \text{ if } a \ll b \\ \in (0, 1) \text{ otherwise} \end{cases}$$ [Formula 10]

Here, a and b are homomorphic ciphertexts.

$$L_{a>b}(a, b) = (a < b) \cdot a + (a < b) \cdot b$$ [Formula 11]

Here, $L_{a>b}(a, b)$ is a comparison function that outputs a bigger value between the two input homomorphic ciphertexts a, b. For example, if a>b, a may be returned, and if a<b, b may be returned. Meanwhile, the approximate sign function (a>b) is a sign function which calculates a value as the formula 10 according to a comparison of homomorphic ciphertexts.

Also, the bigger value and the smaller value between the two values may be calculated as max(a, b) and min(a, b), and each of the max(a, b) and min(a, b) may be expressed as follows by using the aforementioned approximate sign function.

$$\max(a, b) = (a > b) \cdot a + (a < b) \cdot b$$ [Formula 12]

$$\min(a, b) = (a > b) \cdot b + (a < b) \cdot a$$

Here, it can be identified that the max(a, b) is identical to the aforementioned comparison function. Also, the minimum value may be calculated by a calculation between an output value and an input value of the max(a, b), without using the comparison function. Through such a calculation, a function simultaneously outputting the maximum value and the minimum value between the two values may be expressed as follows.

$$LT_{(a>b)}(a, b) = (L_{a>b}(a, b), a + b - L_{a>b}(a, b))$$ [Formula 13]

Here, $LT_{(a>b)}(a, b)$ is the function simultaneously outputting the maximum value and the minimum value between the two values.

Meanwhile, a sign function is a non-polynomial calculation that cannot be expressed as an addition, a subtraction, and a multiplication. Accordingly, in the disclosure, an approximate sign function is used for applying a sign function to a homomorphic ciphertext.

For example, various forms may be used for an approximate sign function, and in the disclosure, a well-structured composite function is used to have low complexity. Here, a composite function used may be a composite function f(x) of which function output value for an input value which is not 0 is made to be horizontal, i.e., a composite function of which output value is made to be close to 1 regarding an input value bigger than 0, and of which output value is made to be close to −1 regarding an input value smaller than 0, or a composite function g(x) of which function output value for an input value which is not 0 is made to be horizontal.

Examples of the aforementioned two composite functions f(x) and g(x) are as a formula 14.

$$f_3(x) = (35x - 35x^3 + 21x^5 - 5x^7)/2^4$$ [Formula 14]

$$g_3(x) = (4589x - 16577x^3 + 25614x^5 - 12860x^7)/2^{10}$$

In actual implementation, an approximate sign function may be implemented by repetitively applying the aforementioned f(x) and g(x) by a plurality number of times. The forms of an approximate sign function used in the disclosure will be described later with reference to FIG. 4 and FIG. 5.

As described above, the 5-way sorter 500 in the disclosure may perform sorting with an approximate sign function implemented as the aforementioned composite functions. A sorting operation regarding three or more homomorphic ciphertexts will be described later with reference to FIGS. 7, 8, and 9, and hereinafter, the reason for sorting a large amount of homomorphic ciphertexts by using a 5-way sorter, but not by using a 2-way sorter will be explained.

The main technical characteristic of the disclosure is reducing overheads in a process of performing sorting for a plurality of homomorphic ciphertexts.

First, a sorter can perform sorting for input data only when all comparison operations between subjects to be compared are performed. For example, in a condition wherein a>b and a>c, if there is no comparison condition for b and c, a, b and c cannot be sorted. Accordingly, for sorting regarding k homomorphic ciphertexts, comparisons of $$\binom{k}{2}$$

times is required.

If Single Instruction, Multiple Data (SIMD) is applied, $$\left\lceil \frac{1}{k}\binom{k}{2} \right\rceil = \left\lceil \frac{k-1}{2} \right\rceil$$

times of comparisons having k slots are spent. That is, in a case wherein comparisons can proceed in parallel, the number of times required in a comparison operation is $$\left\lceil \frac{k-1}{2} \right\rceil.$$

Meanwhile, in comparison operations for homomorphic ciphertexts, various kinds of calculation processing are performed, and an operation that takes the biggest time in a sorting operation is a bootstrapping operation. Accordingly, if bootstrapping operations can be processed in parallel, there would be no big difference between a time spent for comparison operations of two times and a time spent for a comparison operation of one time.

Considering this, in the disclosure, two bootstrapping operations can be performed at once, and accordingly, the number of times required for the aforementioned comparison operations is $$\left\lceil \frac{k-1}{2} \right\rceil = 2,$$

and thus k becomes 5. Accordingly, in the disclosure, a 5-way sorter that compares five homomorphic ciphertexts in a single stage is used.

Hereinafter, the reason that two bootstrapping operations can be performed at once will be described briefly.

If bootstrapping for two ciphertexts $ct_1$, $ct_2$ is needed, i is multiplied to the second ciphertext $ct_2$, and the second ciphertext $ct_2$ to which i was multiplied is added to the first ciphertext $ct_1$, and one ciphertext ($c=c_1+ic_2$) may be calculated.

Afterwards, a bootstrapping operation for the summed-up value ($c=c_1+ic_2$) may be performed, and through a calculation as the aforementioned formula 15, a bootstrapping value $c_1$ for the first ciphertext, and a bootstrapping value $c_2$ for the second ciphertext may be calculated.

$$c_1 = \frac{c+\bar{c}}{2} \text{ and } c_2 = \frac{\bar{c}-c}{2}i \qquad \text{[Formula 15]}$$

Thus, conceiving an idea from the fact that a homomorphic ciphertext has a real number part and an imaginary number part, and an actual value is located in the real number part as can be seen above, two homomorphic ciphertexts can be processed through one bootstrapping operation.

Also, as five homomorphic ciphertexts can be sorted at once as can be seen above, the number of the entire stages can be reduced more than a case of sorting two homomorphic ciphertexts at once.

In case input data is $n=k^m$, the number of stages $N_{n,k}$ needed for sorting is as follows.

$$N_{n,k} = m + \left\lceil \frac{k}{2} \right\rceil \times \frac{m(m-1)}{2} = \log_k n + \left\lceil \frac{k}{2} \right\rceil \times \frac{\log_k n(\log_k n - 1)}{2} \qquad \text{[Formula 16]}$$

For example, comparing a case wherein k is 2 and a case wherein k is 5, the ratio of stages in each case is as follows.

$$\frac{N_{n,2}}{N_{n,5}} \approx \frac{3(\log_5 n)^2}{(\log_2 n)^2} = 3 \times \left(\frac{\log 2}{\log 5}\right)^2 = 0.556 \qquad \text{[Formula 17]}$$

As can be seen above, in case input data is sufficiently big, the number of the entire stages can be reduced by 44% by using a 5-way sorter compared to a case of using a 2-way sorter.

As described above, the 5-way sorter in the disclosure performs a sorting operation through the aforementioned polynomial calculation between a composition function and an input function.

Meanwhile, each homomorphic ciphertext 10, 20, 30, 40, 50 may respectively include an approximate message area 11, 21, 31, 41, 51. In the approximate message areas 11, 21, 31, 41, 51, messages and errors m1+c1, m2+c2, m3+c3, m4+c4, m5+e5 are put in together.

Accordingly, when calculations are repeated through a sorting operation, approximate message areas of homomorphic ciphertexts become bigger, and the remaining plain sentence spaces are reduced.

Calculations need to be performed after sorting. Or, if plain sentence spaces become smaller than a threshold value during a calculation process for performing sorting, the 5-way sorter 500 may perform a bootstrapping operation for each homomorphic ciphertext.

Meanwhile, in the illustrated example, it is illustrated that a bootstrapping operation is performed after a sorting operation, but in actual implementation, the aforementioned bootstrapping operation may be performed inside the 5-way sorter.

Figure 4:
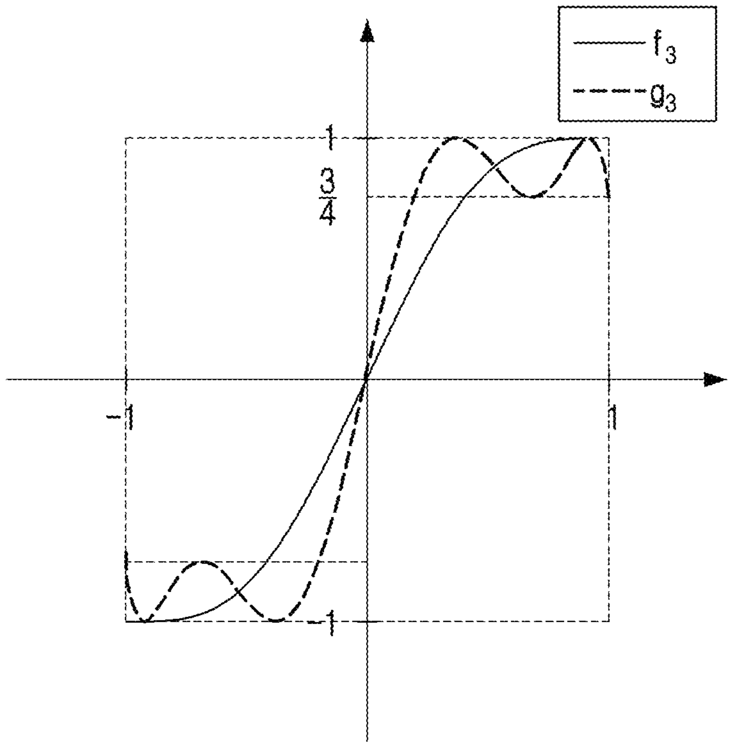
FIG. 4 and FIG. 5 are diagrams illustrating various forms of composite functions related to sign functions.
Figure 5:
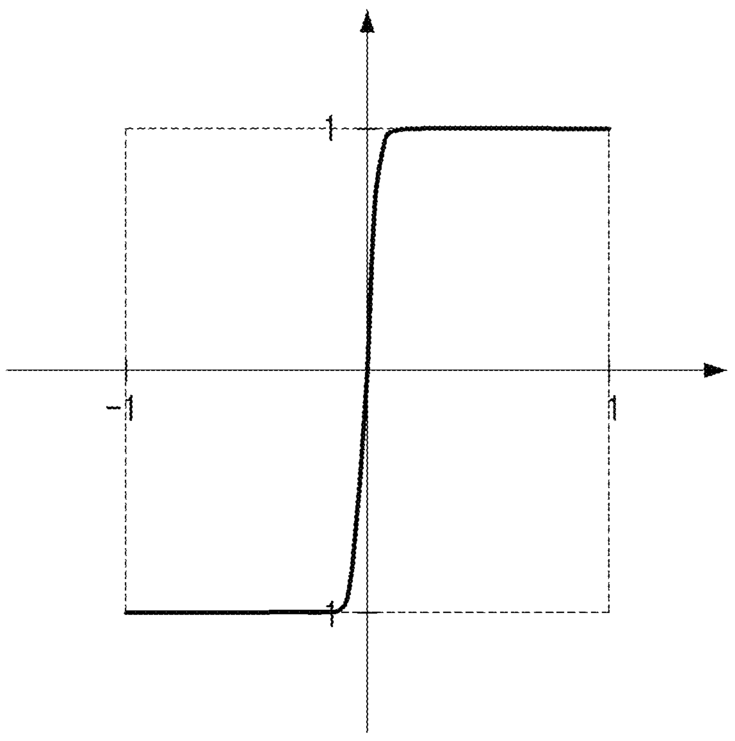

FIG. 4 and FIG. 5 are diagrams illustrating various forms of composite functions related to sign functions. Specifically, FIG. 4 is a diagram illustrating f(x) and g(x), and FIG. 5 is a diagram illustrating a composition function wherein f(x) and g(x) are combined.

Referring to FIG. 4, it can be identified that the error in the end part of f(x) is small, but f(x) has a small tilt. Also, it can be identified that g(x) has a bigger tilt than f(x), but errors occur on both end parts. Accordingly, in the case of using a g(x) composite function in the initial period and using a f(x) composite function in the later period, i.e., if a combined composite function is used by the method as in FIG. 5, a more ideal form may be provided than using only one composite function based on the same number of times of repetition.

Meanwhile, the degree of the aforementioned g(x) and f(x) may be n. However, as the preceding coefficient of f4(=35/128) and g4 (=46623/1024) is a positive number, in case the absolute value of the input x is bigger than 1, the compositions of f4 and g4'S may vary. For example, if the input x is close to 1, the comparison result may be branched off due to an accompanying error, and thus a wrong output may be generated.

Accordingly, in the disclosure, 3 which is an optimal value among odd number values but not even number values are used for n. A calculation regarding (x>y) may be calculated by a formula 18 as follows by the given numbers of repetition df and dg.

$$(x > y) = \left(f_3^{(d_f)} \circ g_3^{(d_g)}(x - y) + 1\right)/2 \quad \text{[Formula 18]}$$

Here, $f^{(d)}$ means performing f∘f∘f . . . ∘f by a D number of times.

By using a composite function as above, i.e., by using a well-structured polynomial, a sign function can be approximated with relatively low θ(α) or θ(α log α) complexity correspondingly to the precision of $2^{-\alpha}$.

Figure 6:
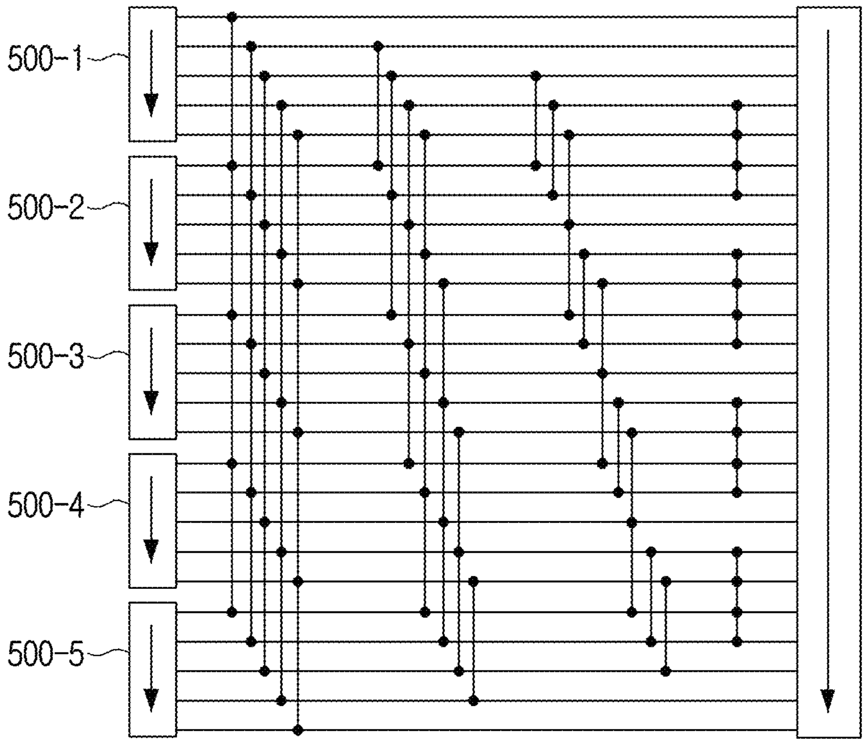
FIG. 6 is a diagram for illustrating a sorting operation for a large amount of homomorphic ciphertexts.

FIG. 6 is a diagram for illustrating a sorting operation for a large amount of homomorphic ciphertexts. Specifically, FIG. 6 is a diagram for illustrating a 5-way sorting method regarding $5^2$ data.

Referring to FIG. 6, each line indicates a 5-way sorter, and a point in each line indicates an input value of the 5-way sorter. The five arrows on the left side indicate a main stage sorting five neighboring ciphertexts, and the arrow on the right side indicates the sorting direction from the minimum number to the maximum number.

In a 5-way sorting algorithm, a matrix of a length $5^m$ for a value m may be arrayed by merging five sorted arrays of a length $5^{i-1}$ and simultaneously applying them repetitively, for generating a sorted array of a length $5^i$.

Such a 5-way algorithm may not only operate with a 5-way sorter, but also with a 2-way sorter, a 3-way sorter, and a 4-way sorter. Sorting for two homomorphic ciphertexts was already described with reference to FIG. 3, and sorting methods regarding three to five homomorphic ciphertexts will be described later with reference to FIG. 7 to FIG. 9.

For example, in case m=2, in sorting regarding $5^2$ homomorphic ciphertexts, sorting processing may be performed by using five 5-way sorters in parallel as illustrated.

FIG. 7 is a diagram for illustrating a sorting operation for three homomorphic ciphertexts.

Referring to FIG. 7, in case the first to third homomorphic ciphertexts a, b, c are input, the 5-way sorter 500 may calculate the bigger value max and the smaller value min between the first homomorphic ciphertext a and the second homomorphic ciphertext b by using an LT comparison function.

Afterwards, the 5-way sorter 500 may input the calculated bigger value max and the third homomorphic ciphertext c, and calculate the biggest value w1 among the three.

Then, the 5-way sorter 500 may input the calculated smaller value min and the third homomorphic ciphertext c into the comparison function, and calculate the smallest value w3 among the three.

Then, the 5-way sorter 500 may calculate the median value w2 through a calculation w2=a+b+c−w1−w3.

Through such a calculating operation, the 5-way sorter 500 may sort the input three homomorphic ciphertexts a, b, c, and output the biggest value, the median value, and the smallest value respectively as the first output value w1, the second output value w2, and the third output value w3.

FIG. 8 is a diagram for illustrating a sorting operation for four homomorphic ciphertexts.

Referring to FIG. 8, if the first to fourth homomorphic ciphertexts a, b, c, d are input, the 5-way sorter 500 may first divide the four ciphertexts into two groups, and may first perform comparison operations in the respective groups.

Specifically, the 5-way sorter 500 may calculate the bigger value max1 and the smaller value min1 regarding the first homomorphic ciphertext a and the second homomorphic ciphertext b within the A group by using an LT comparison function.

Then, the 5-way sorter 500 may calculate the bigger value max2 and the smaller value min2 regarding the third homomorphic ciphertext c and the fourth homomorphic ciphertext d within the B group by using the LT comparison function.

Then, the 5-way sorter 500 may calculate the smaller value x1 between the bigger value max1 in the A group and the smaller value min2 in the B group, and calculate the smaller value x2 between the smaller value min1 in the A group and the bigger value max2 in the B group.

Afterwards, the 5-way sorter 500 may compare the calculated bigger values max1 and max2 in the respective groups, and calculate the biggest value w1.

Then, the 5-way sorter 500 may compare the calculated smaller values x1 and x2, and calculate the second biggest value w2.

Then, the 5-way sorter 500 may compare the calculated smaller values min1 and min2 in the respective groups, and calculate the smallest value w4.

Then, the 5-way sorter 500 may calculate the third biggest value w3 through a calculation w3=a+b+c+d−w1−w2−w4.

Through such a calculating operation, the 5-way sorter 500 may sort the input four homomorphic ciphertexts a, b, c, d, and output the biggest value, the second value, the third value, and the smallest value respectively as the first output value w1, the second output value w2, the third output value w3, and the fourth output value w4.

FIG. 9 is a diagram for illustrating a sorting operation for five homomorphic ciphertexts.

Referring to FIG. 9, in case the first to fifth homomorphic ciphertexts a, b, c, d, c are input, the 5-way sorter 500 may first divide the five ciphertexts into two groups, and may first perform comparison operations for the respective groups.

For example, regarding the first to third homomorphic ciphertexts a, b, c within the A group, the 5-way sorter 500 may calculate the biggest value max1, the median value mid1, and the smallest value min1 by using a 3-way sorting method.

Then, the 5-way sorter 500 may calculate the bigger value max2 and the smaller value min2 regarding the fourth and fifth homomorphic ciphertexts d, e by using an LT comparison function.

Then, for determining the second biggest number, the 5-way sorter 500 may calculate the smaller value x1 between the bigger value max1 in the A group and the smaller value min2 in the B group, and calculate the smaller value x2 between the median value mid1 in the A group and the bigger value max2 in the B group.

Also, for determining the second smallest number (the fourth biggest number), the 5-way sorter 500 may calculate the bigger value y1 between the smaller value min1 in the A group and the bigger value max2 in the B group, and calculate the bigger value y2 between the median value mid1 in the A group and the smaller value min2 in the B group.

Afterwards, the 5-way sorter 500 may compare the bigger values max1 and max 2 in the respective groups, and calculate the biggest value w1.

Then, the 5-way sorter 500 may compare the calculated smaller values x1 and x2, and calculate the second biggest value w2.

Then, the 5-way sorter 500 may compare the calculated bigger values y1 and y2, and calculate the second smallest value w4.

Then, the 5-way sorter 500 may compare the smaller values min1 and min2 in the respective groups, and calculate the smallest value w5.

Then, the 5-way sorter 500 may calculate the third output value w3 through a calculation $w3=a+b+c+d+c-w1-w2-w4-w5$.

Through such a calculating operation, the 5-way sorter 500 may sort the input five homomorphic ciphertexts a, b, c, d, e, and output the biggest value, the second value, the third value, the fourth value, and the smallest value respectively as the first output value w1, the second output value w2, the third output value w3, the fourth output value w4, and the fifth output value w5.

Meanwhile, the sorting algorithm illustrated and described in FIGS. 7 to 9 is merely an example, and other methods may be used.

Figure 10:
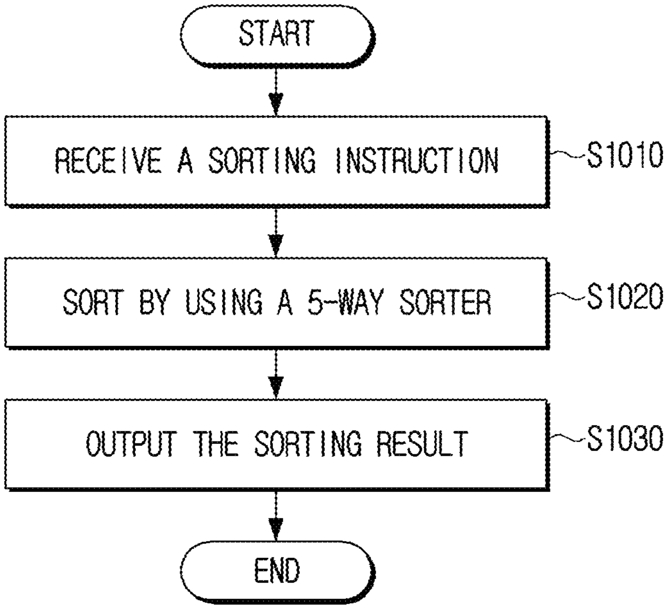
FIG. 10 is a flow chart for illustrating a method for calculating a ciphertext according to an embodiment of the disclosure.

FIG. 10 is a flow chart for illustrating a method for calculating a ciphertext according to an embodiment of the disclosure.

Referring to FIG. 10, a sorting instruction for a plurality of homomorphic ciphertexts are input in operation S1010. For example, the plurality of homomorphic ciphertexts may be ciphertexts satisfying the aforementioned formula 1.

Then, the plurality of homomorphic ciphertexts are sorted by using a 5-way sorter which can sort five homomorphic ciphertexts in a single stage in operation S1020. Here, in case there are six or more homomorphic ciphertexts, parallel sorting processing may be performed by using a plurality of 5-way sorters. Here, the 5-way sorters may perform sorting by using a comparison function that selectively outputs a bigger value or a smaller value between two input values.

Then, the sorting result is output in operation S1030. For example, in case a plurality of homomorphic ciphertexts were received from an external apparatus, the sorting result may be transmitted to the external apparatus in the order of sorting. In contrast, in case the sorting is a sorting for a plurality of pre-stored homomorphic ciphertexts, the order of storing will be sorted through the aforementioned sorting operation, and thus the aforementioned sorting operation may be omitted.

As described above, in the method for processing homomorphic ciphertexts according to this embodiment, sorting processing for a large amount of homomorphic ciphertexts is possible, and also, sorting for a plurality of homomorphic ciphertexts is performed with fewer stages, and accordingly, sorting can be performed faster.

As detailed operations in each stage were described above, detailed explanation will be omitted.

Meanwhile, the methods according to the various embodiments of the disclosure as described above may be implemented in forms of applications that can be installed on conventional calculation devices (or electronic devices).

Also, the methods according to the various embodiments of the disclosure as described above may be implemented just by software upgrade, or hardware upgrade of conventional calculation devices (or electronic devices).

In addition, the various embodiments of the disclosure as described above may be performed through an embedded server provided on a calculation device, or an external server of at least one of calculation devices.

Meanwhile, according to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include a display device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as processes and functions described in this specification may be implemented as separate software modules. Each of the software modules can perform one or more functions and operations described in this specification.

Meanwhile, computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

So far, preferred embodiments of the disclosure have been shown and described, but the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method for processing homomorphic ciphertexts, the method comprising:

receiving an input of an instruction for sorting regarding a plurality of homomorphic ciphertexts;

sorting the homomorphic ciphertexts by using a k-way sorter configured to sort k homomorphic ciphertexts in a single stage, wherein k is an integer equal to or greater than 3; and outputting a sorting result, wherein the k-way sorter is configured to:

perform sorting by using a comparison function that selectively outputs a bigger value or a smaller value between two input values, divide the k homomorphic ciphertexts into a first group and a second group by sorting each of the first group and the second group using at least one of a 3-way sorter and a less-than (LT) comparison function, and generate k sorted homomorphic ciphertexts by performing homomorphic operations based on sorting results of the first group and the second group.

2. The method for processing homomorphic ciphertexts of claim 1, wherein the sorting comprises:

performing a parallel sorting process by using a plurality of the k-way sorters.

3. The method for processing homomorphic ciphertexts of claim 1, wherein the comparison function is calculated through a multiplication calculation between an approximate sign function outputting a predetermined value according to comparison of sizes and an input value.

4. The method for processing homomorphic ciphertexts of claim 3, wherein the approximate sign function is a function which is a result of repetitively calculating a composite function of which output value is made to be close to 1 regarding an input value bigger than 0, and of which output value is made to be close to −1 regarding an input value smaller than 0 by a predetermined number of times.

5. The method for processing homomorphic ciphertexts of claim 4, wherein the approximate sign function is a function which is a result of repetitively calculating two different composite functions by three times, respectively.

6. The method for processing homomorphic ciphertexts of claim 1, wherein the k-way sorter is 5-way sorter:

the 5-way sorter is configured to:

based on a first homomorphic ciphertext, a second homomorphic ciphertext, and a third homomorphic ciphertext being input, calculate a bigger value and a smaller value between the first homomorphic ciphertext and the second homomorphic ciphertext by using the comparison function, input the calculated bigger value and the third homomorphic ciphertext into the comparison function and output a first output value, input the calculated smaller value and the third homomorphic ciphertext into the comparison function and output a third output value, and calculate a second output value by subtracting the first output value and the third output value from a summed-up value for the first to third homomorphic ciphertexts and output the second output value.

7. The method for processing homomorphic ciphertexts of claim 1, wherein the k-way sorter extends plain sentence spaces of the k sorted homomorphic ciphertexts.

8. A calculation device comprising:

a memory that stores a plurality of homomorphic ciphertexts for an approximate message including an error; and a processor that sort the homomorphic ciphertexts by using a k-way sorter configured to sort k homomorphic ciphertexts in a single stage, wherein k is an integer equal to or greater than 3, wherein the k-way sorter is configured to:

perform sorting by using a comparison function that selectively outputs a bigger value or a smaller value between two input values, divide the k homomorphic ciphertexts into a first group and a second group by sorting each of the first group and the second group using at least one of a 3-way sorter and a less-than (LT) comparison function, and generate k sorted homomorphic ciphertexts by performing homomorphic operations based on sorting results of the first group and the second group.

9. The calculation device of claim 8, wherein the processor is configured to:

perform a parallel sorting process by using a plurality of the k-way sorters.

10. The calculation device of claim 8, wherein the comparison function is calculated through a multiplication calculation between an approximate sign function outputting a predetermined value according to comparison of sizes and an input value.

11. The calculation device of claim 10, wherein the approximate sign function is a function which is a result of repetitively calculating a composite function of which output value is made to be close to 1 regarding an input value bigger than 0, and of which output value is made to be close to −1 regarding an input value smaller than 0 by a predetermined number of times.

12. The calculation device of claim 11, wherein the approximate sign function is a function which is a result of repetitively calculating two different composite functions by three times, respectively.

13. The calculation device of claim 8, wherein the k-way sorter is 5-way sorter:

the 5-way sorter is configured to:

based on a first homomorphic ciphertext, a second homomorphic ciphertext, and a third homomorphic ciphertext being input, calculate a bigger value and a smaller value between the first homomorphic ciphertext and the second homomorphic ciphertext by using the comparison function, input the calculated bigger value and the third homomorphic ciphertext into the comparison function and output a first output value, input the calculated smaller value and the third homomorphic ciphertext into the comparison function and output a third output value, and calculate a second output value by subtracting the first output value and the third output value from a summed-up value for the first to third homomorphic ciphertexts and output the second output value.

14. The calculation device of claim 8, wherein the k-way sorter extends plain sentence spaces of the k sorted homomorphic ciphertexts.

15. A non-transitory computer-readable recording medium including a program for executing a method for processing homomorphic ciphertexts, the method comprising:

receiving an input of an instruction for sorting regarding a plurality of homomorphic ciphertexts; and sorting the homomorphic ciphertexts by using a k-way sorter configured to sort k homomorphic ciphertexts in a single stage, wherein k is an integer equal to or greater than 3, wherein the k-way sorter is configured to:

perform sorting by using a comparison function that selectively outputs a bigger value or a smaller value between two input values, divide the k homomorphic ciphertexts into a first group and a second group by sorting each of the first group and the second group using at least one of a 3-way sorter and a less-than (LT) comparison function, and generate k sorted homomorphic ciphertexts by performing homomorphic operations based on sorting results of the first group and the second group.

* * * * *